United States Patent

[11] 3,591,724

[72] Inventors Tadao Yaku
Sendai-shi;
Shogo Isizaki, Urawa-shi; Kunihiko
Fujiwara, Tokyo; Kazuya Ohzeki, Tokyo;
Tatsumi Yamaki, Tokyo, all of, Japan
[21] Appl. No. 653,212
[22] Filed July 13, 1967
[45] Patented July 6, 1971
[73] Assignees Japanese National Railways;
Nippon Electric Company, Limited
Tokyo, Japan
[32] Priority July 15, 1966
[33] Japan
[31] 41/46255

[54] LOAD SENSITIVE SWITCHING NETWORK SYSTEM
4 Claims, 9 Drawing Figs.

[52] U.S. Cl. .......... 179/18 EA
[51] Int. Cl. .......... H04g 3/56
[50] Field of Search .......... 179/18.21, 18 EA

[56] References Cited
UNITED STATES PATENTS

| | | | |
|---|---|---|---|
| 3,342,945 | 9/1967 | Hopper et al. | 179/18 (.21) |
| 3,394,231 | 7/1968 | Hopper et al. | 179/18 (.21) |
| 3,411,140 | 11/1968 | Halina et al. | 179/18 (.21) |

*Primary Examiner*—Kathleen H. Claffy
*Assistant Examiner*—Randall P. Myers
*Attorney*—Hopgood and Calimafde

ABSTRACT: A plurality of common control automatic switching offices are each provided with an "exchange-trunk information" unit for deriving exchange-trunk or load information representing the load or capacity of the exchange and the interoffice trunk groups extending from the exchange. One of the offices is equipped with an "availability information" unit for translating the exchange-trunk information sent from all the exchange-trunk information units into availability information representing whether the exchanges and the interoffice trunk line groups are available for new calls. Each office is further provided with means responsive to the availability information for controlling the establishment of the connection.

INVENTORS
TADAO YAKU
SHOGO ISIZAKI
KUNIHIKO FUJIWARA
KAZUYA OHZEKI
TATSUMI YAMAKI
BY
Hopgood & Calimafde
ATTORNEYS INVENTORS
TADAO YAKU
SHOGO ISIZAKI
BY KUNIHIKO FUJIWARA
KAZUYA OHZEKI
TATSUMI YAMAKI
Hopgood & Calimafde
ATTORNEYS INVENTORS
TADAO YAKU
SHOGO ISIZAKI
BY KUNIHIKO FUJIWARA
KAZUYA OHZEKI
TATSUMI YAMAKI
Hopgood & Calimafde
ATTORNEYS INVENTORS
TADAO YAKU
SHOGO ISIZAKI
BY KUNIHIKO FUJIWARA
KAZUYA OHZEKI
TATSUMI YAMAKI Hopgood & Calimafde
ATTORNEYS INVENTORS
TADAO YAKU
SHOGO ISIZAKI
KUNIHIKO FUJIWARA
KAZUYA OHZEKI
TATSUMI YAMAKI
BY
Hopgood & Calimafde
ATTORNEYS INVENTORS
TADAO YAKU
SHOGO ISIZAKI
BY KUNIHIKO FUJIWARA
KAZUYA OHZEKI
TATSUMI YAMAKI Hopgood & Calimafde
ATTORNEYS

LOAD SENSITIVE SWITCHING NETWORK SYSTEM

This invention relates to a multioffice switching network system where the call is sent through a plurality of intermediate common control automatic switching offices to the called party; the system being sensitive to the load or capacity of the intermediate switching offices and interoffice trunk lines for the call.

Conventionally, where a call is to be transmitted through a plurality of intermediate switching offices and interoffice trunk lines, the automatic exchanges in these offices successively search the respective idle outgoing interoffice trunk lines. It is, however, not certain at that point in time whether or not idle lines are available throughout the path of connection leading to the called party. Nevertheless, it has been the practice to carry out the search and connection regardless of this uncertainty. As a result, if the interoffice trunk lines extending from one of the offices are all either busy or in trouble, the preceding offices become useless. It may be possible to avoid this disadvantage, if all sorts of the traffic information concerning the exchanges and the interoffice trunk lines in all possible paths of connection to the called party is known. This, however, is hardly feasible because the capacity of the exchanges and the interoffice trunk line is almost fully used, without any further capacity for detecting and dealing with such traffic information.

The object of this invention is therefore to eliminate the above-mentioned disadvantage and to provide a switching network system of high service efficiency where a master network-controlling device informs the exchanges in the system of the traffic information and enables a call-originating switching office either to send or not send the call through the available exchanges and interoffice trunk lines depending on availability of lines.

According to the instant invention, there is provided a switching network system having a plurality of switching offices, each including switching means, a plurality of trunk lines, each extending between switching means in predetermined two of said offices, wherein the improvement comprises: a load information unit at each of at least two of said switching offices for producing, in response to interrogation, a load information signal substantially representative of the number of unoccupied switching means and trunk lines thereat; only one working availability information unit coupled in common to said load information units and including means for respectively translating said load information signals into availability information signals representative of the availability of said switching means and trunk lines in establishing a new connection; and means at the switching offices having said load information units for controlling the switching means in response to said availability signal.

The present invention will now be explained with reference to the accompanying drawings, in which.

Figure 1:
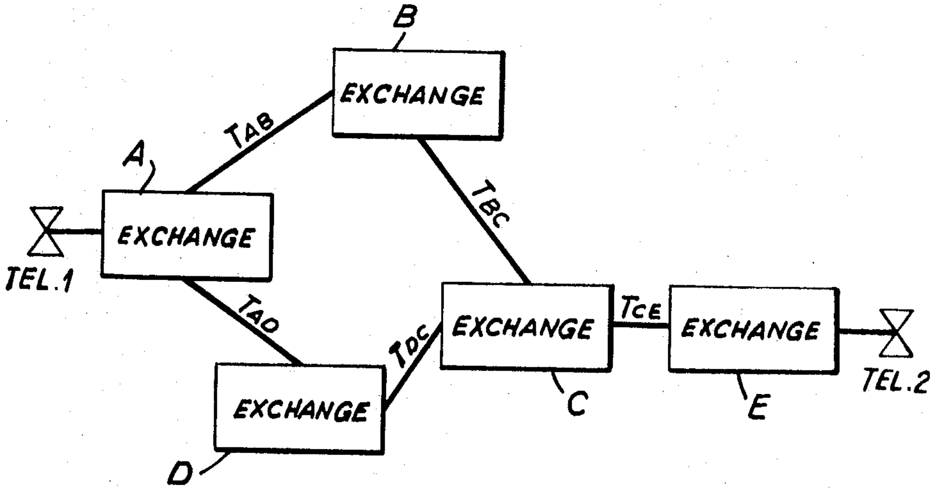
FIG. 1 is a block diagram of a conventional switching network.

Referring to FIG. 1, a first, second, third, fourth, and fifth common control automatic exchanges or switching means A, B, C, D, and E in respective switching offices are interconnected by interoffice trunk line groups $T_{AB}$, $T_{BC}$, $T_{AD}$, $T_{DC}$, and $T_{CE}$ in the manner shown. By way of example, a first and second subscriber's station TEL1 and TEL2 are connected with the first and the fifth exchanges A and E, respectively. Let it now be assumed that the first subscriber's station calls up the second subscriber's station and that the route A—$T_{AB}$—B—$T_{BC}$—C has the preference or priority over the alternative route A—$T_{AD}$—D—$T_{DC}$—C. The first exchange A at first selects an idle interoffice trunk line among the interoffice trunk line group $T_{AB}$ leading to the next exchange B; this exchange B then selects an idle interoffice trunk line among the interoffice trunk line group $T_{BC}$ leading to the subsequent exchange C; and this exchange selects an idle interoffice trunk line among the interoffice trunk line group $T_{CE}$ leading to the desired exchange E, which eventually select extends the connection to the second subscriber's station TEL2 if this is idle. It may be so arranged that if the trunk lines of the interoffice trunk line group $T_{CE}$ are all either busy or in trouble, the first exchange A tries to establish the connection through the alternative route. Nonetheless, the connection between these subscriber pair TEL1 and TEL2 is impossible and the busy tone is heard at the first subscriber's station TEL1. This means that the hitherto established paths of connection A—$T_{AB}$—B—$T_{BC}$—C and A—$T_{AD}$—D—$T_{DC}$—C become useless and the operation of the exchanges B, C, and D is wasted. Such useless and wasteful operation of the system results from the fact that the busy or faulty state of the interoffice trunk line group $T_{CE}$ cannot be found until the series of connection operation reaches the exchange C at first through the route A—$T_{AB}$—B—$T_{BC}$—C and then through the alternative route A—$T_{AD}$—D—$T_{DC}$—C.

Figure 2:
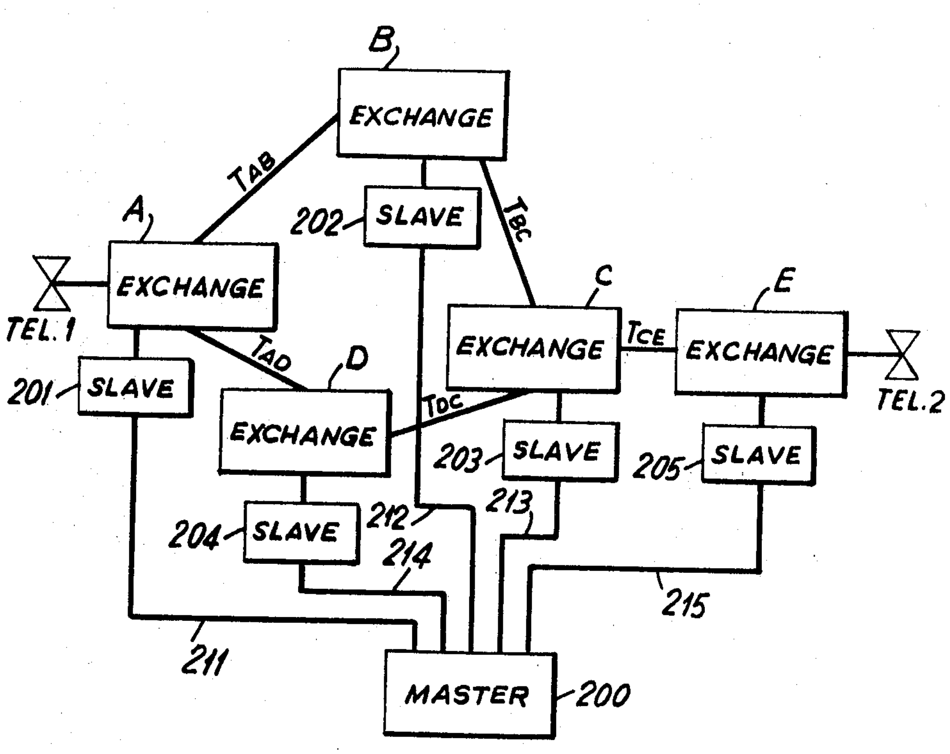
FIGS. 2 and 3 are, respectively, block diagrams of an embodiment of the invention and details thereof.
Figure 3:
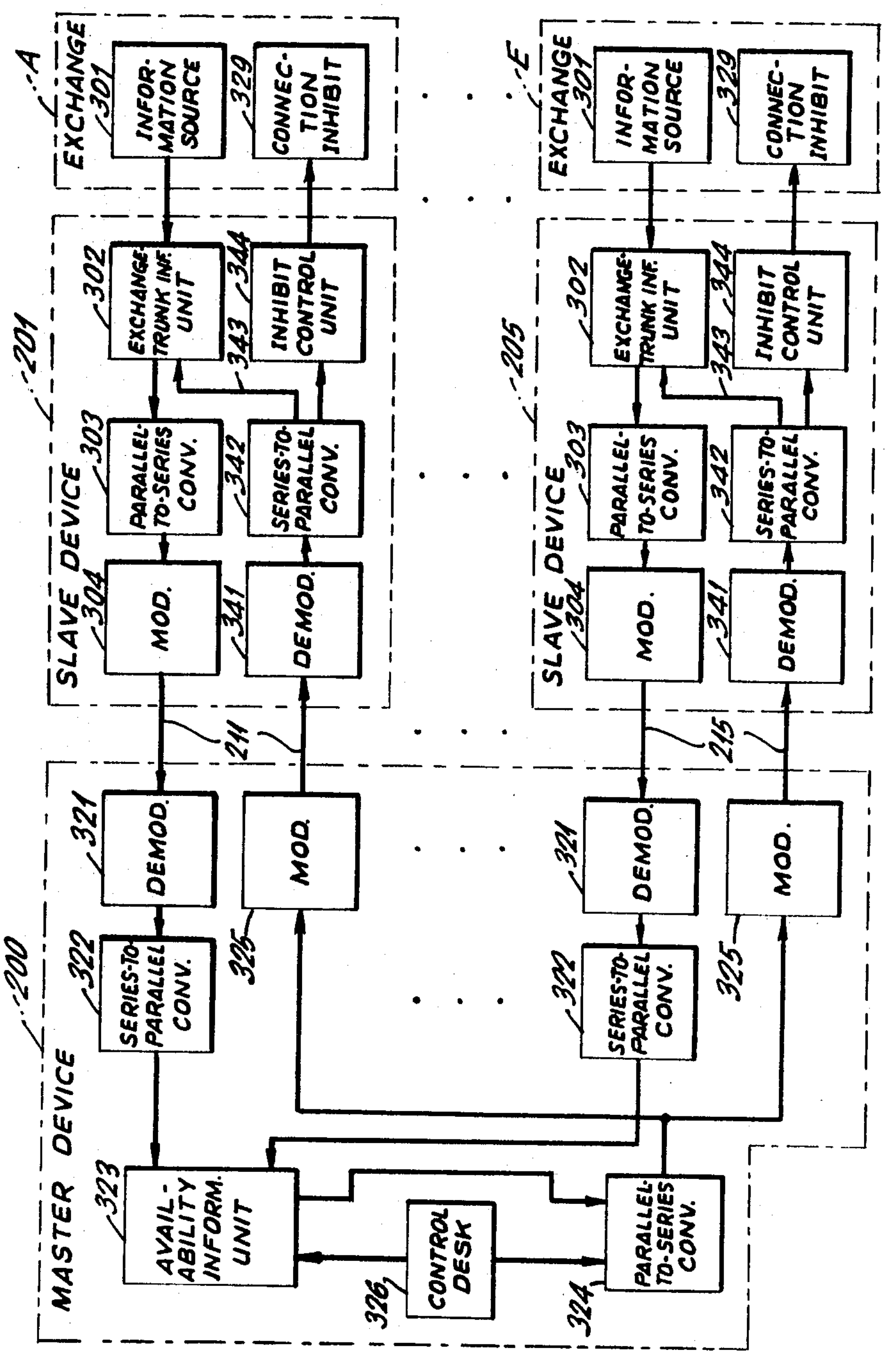

Referring to FIGS. 2 and 3, a first embodiment of this invention comprises: a conventional switching network shown in FIG. 1; a network-controlling master device 200; first, second, third, fourth, and fifth network-controlling slave devices 201, 202, 203, 204, and 205 for the first, second, third, fourth, and fifth common control automatic exchanges A, B, C, D, and E, respectively; and first, second, third, fourth, and fifth data links 211, 212, 213, 214, and 215 respectively connecting the slave devices 201, 202, 203, 204, and 205 with the master device 200. As will be understood later, only two of the exchanges A, B, C, D, and E may be provided with the slave device.

From FIG. 3, it may be seen that each of the exchanges A, B, C, D, and E has an information source 301 capable of showing from time to time the number of those calls which the common control device in the exchange can still handle at that particular instant and the number of those interoffice trunk lines in each of the interoffice trunk line groups extending from the exchange which can as yet be used to extend the required connection. Each of the slave devices 201, 202, 203, 204, and 205 comprises: an exchange-trunk or a load information unit 302 connected with the information source 301 of the same exchange for producing exchange-trunk information or a load information signal which is parallel-code information representing from time to time the above-mentioned numbers; a parallel-to-series converter 303 connected with the exchange-trunk information unit 302 for converting the parallel-code information into series-code information which is more convenient for transmission to the master device 200 than the former; and a modulator 304 connected with the parallel-to-series converter 303 for sending the series-code information carried on a carrier oscillation to the master device 200 through the data link 211, 212, 213, 214, or 215 extended from the relevant slave device. The parallel-to-series converter 303 serves also to supplement each group or character of the resulting series-code information with both a synchronizing signal and a set of parity check bits. As will later become apparent, only two of the slave devices 201, 202, 203, 204, and 205 may be furnished with the exchange-trunk information unit 302, the parallel-to-series converter 303, and the modulator 304. The master device 200 comprises: a demodulator 321 connected with each of the modulators 304 for demodulating the modulated carrier oscillation to derive the reproduction of the series-code information; a series-to-parallel converter 322 connected with each of the demodulators 321 for converting the output of the related demodulator 321 into paralleltcode information which corresponds to that produced by the associated exchange-trunk information unit 302 and which may also be called the exchange-trunk information; an availability information unit 323 connected with all the series-to-parallel converters 322 for producing availability information which is parallel-code information representing from time to time whether each of the exchanges having the slave devices, and of those interoffice trunk line groups extending from the last-mentioned exchanges is available in establishing a new connection; a parallel-to-series converter 324 connected with the availability information unit 323 for converting the parallel-code availability information to series-code availability information and for supplementing each character of such series codes with both a synchronizing signal and a set of parity check bits; and modulators 325, equal in number to the slave devices 201 and so on, connected with the parallel-to-series converter 324 for sending the series-code availability information carried on the respective carrier oscillations to all the slave devices 201, 202, 203, 204, and 205 through the respective data links 211, 212, 213, 214, and 215. If desired, the master device 200 may have a control desk 326 connected with the availability information unit 323 and with the master device parallel-to-series converter 324 for manually controlling in the conventional manner the service of the switching network, such as imposition of limitation on some of the interoffice trunk line groups or alteration of the preference of the alternative routes. The availability information unit 323 comprises means for producing a series of seizing signal or in interrogation signal which, while present, keeps the system of this invention in operation. As will become clear later, the seizing signal is produced intermittently. If necessary, the master device 200 may still further comprise an indicating and a recording unit (not shown) connected with the availability information unit 323 for indicating and recording, respectively, the status of the exchanges having the slave devices and the interoffice trunk line groups extending from the last-mentioned exchanges. The seizing signal is sent, accompanying the series-code availability information, to all the slave devices 201, 202, 203, 204, and 205. Each of the exchanges A, B, C, D, and E having the slave devices has a connection inhibition unit 329 coupled with the slave device of the exchange. Each of the slave devices 201, 202, 203, 204, and 205 further comprises: a demodulator 341 connected with the master device modulator 325 for demodulating the modulated carrier oscillation sent from the master device 200 to derive the reproduction of the series-code availability information; a series-to-parallel converter 342 connected with the demodulator 341 for converting the series-code availability information to parallel-code seizing signal-availability information; a connection 343 between the series-to-parallel converter 342 and the exchange-trunk information unit 302 for transferring the seizing signal from the former to the latter; and an inhibition control unit 344 connected with the series-to-parallel converter 342 and coupled with the connection inhibition unit 329 of the exchange this slave device is provided for, for controlling the connection inhibition unit 329 in response to the parallel-code availability information so that the exchange may not extend the connection any further when the parallel-code availability information shows absence of available exchanges having the slave devices and interoffice trunk line groups extending from the last-mentioned exchanges are connected with, which must eventually be used to establish the desired connection. The slave devices 201, 202, 203, 204, and 205, except for two, need not have the exchange-trunk information unit 302, the parallel-to-series converter 303, and the modulator 304, but they should nevertheless include the demodulator 341, the series-to-parallel converter 342, and the inhibit control unit 344. If the exchange-trunk information unit 302 produces a series-code exchange-trunk information or if the parallel code exchange-trunk information per se is sent to the master device 200, no slave device parallel-to-series converter 303 is necessary. Similarly, other series-to-parallel and parallel-to-series converters 322, 324, and 341 may also be dispensed with. In case data links 211, 212, 213, 214, and 215 are composed of going and returning or both-way lines, the modulators and demodulators 304, 321, 325, and 341 are not indispensable.

Figure 4:
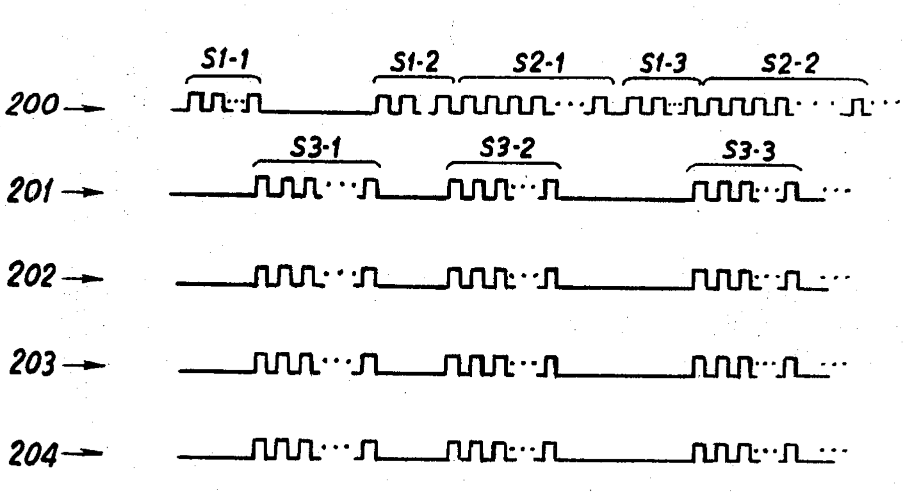
FIG. 4 shows examples of the information sent out from the master device and some of the slave devices of this invention.

Summarizing the operation of this embodiment with reference to FIGS. 2 and 3 and also FIG. 4, the master device 200 sends, upon initiation of the seizing signal, a first portion S1–1 thereof to all the slave devices 201, 202, 203, 204, and 205. Successive portions S1–*i* of the seizing signal have identical code arrangement and are spaced by a predetermined time interval which is preferably equal to the longest of the series-code availability information S2–*i* and of the series-code exchange-trunk information S3–*i* relating to every exchange having the slave device 201, 202, 203, 204, ... and relating to every interoffice trunk line group extending from such an exchange. The first portion S1–1 of the seizing signal makes all the slave devices 201, 202, 203, 204, ... send to the master device 200 the respective series-code exchange-trunk information 201–S3–1, 202–S3–1, 203–S3–1, 204–S3–1, ... representing, for example, the availability of the respective exchanges A, B, C, D, .... The series-code exchange-trunk information 201–S3–1, 202–S3–1, 203–S3–1, 204–S3–1, ... is dealt with by the master device 200 and sent to all the slave devices 201, 202, 203, 204, and 205 as the series-code availability information S2–1 following a second portion S1–2 of the seizing signal. The second portion S1–2 of the seizing signal makes all the slave devices 201, 202, 203, 204, ... send to the master device 200 the respective series-code exchange-trunk information 201–S3–2, 202–S3–2, 203–S3–2, 204–S3–2, ... representing, for example, the availability of the respective interoffice trunk line groups $T_{AB}$, $T_{BC}$, $T_{CE}$, $T_{DC}$, ... . Meanwhile, the availability information S2–1 controls the connection inhibition units 329 of the exchanges A, B, C, D, and E in accordance with the availability of the exchanges having the slave devices. In a similar manner, a second-portion availability information S3–2 controls the connection inhibition units 329 of the exchanges A, B, C, D, and E in accordance with the above-mentioned availability of the exchanges and with the availability of the interoffice trunk line groups $T_{AB}$, $T_{BC}$, $T_{CE}$, $T_{DC}$, ... . After having reached the stationary state, the system of this invention controls each of the exchanges having the slave devices in accordance with the availability of the exchanges having the slave devices and the interoffice trunk line groups extending from these exchanges. It is now assumed that the first subscriber's station TEL 1 calls up the second subscriber's station TEL 2, and only two exchanges, A and D, have the respective slave devices 201 and 204. The master device 200 receives the load information signals from the exchange-trunk information units 302 and transmits the availability information signals to the inhibit control units 344. If the interoffice trunk line group $T_{AD}$ or $T_{DC}$ is not available for the call, but the trunk line group $T_{AB}$ is available, the exchange A tries to establish the path of connection A—$T_{AD}$—D—$T_{DC}$—C for the call.

Figure 5:
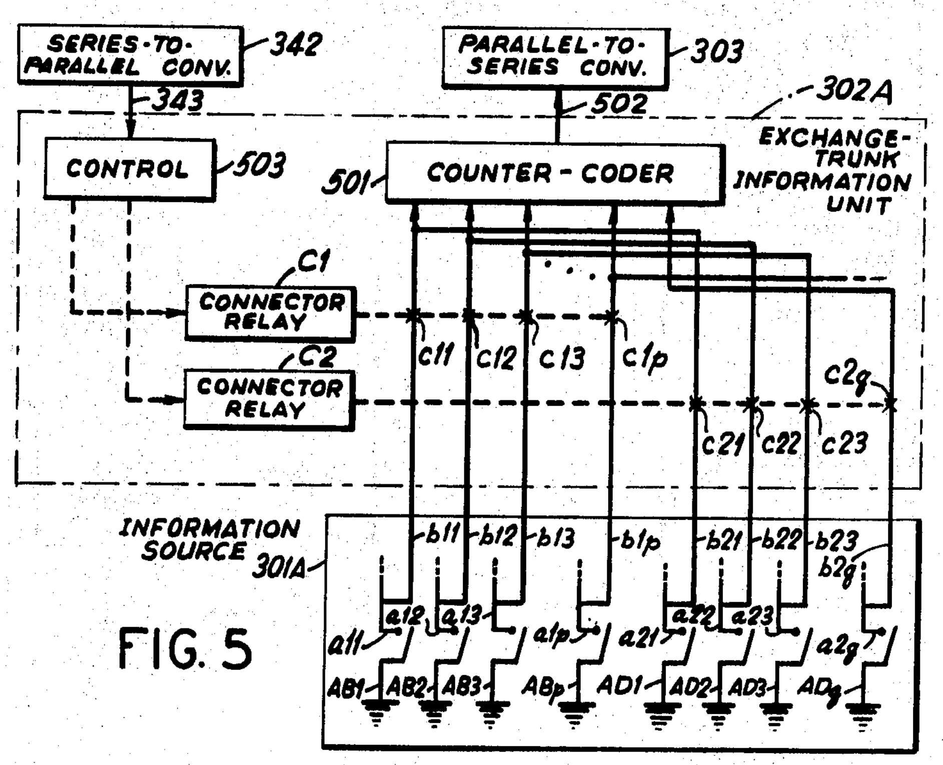
FIG. 5 is a block diagram of an exchange-trunk information unit and related circuits.

Referring to FIG. 5, the information source 301A for the interoffice trunk line groups $T_{AB}$ and $T_{AD}$ is nothing but those portions of the interoffice trunk lines AB1, AB2, AB3, ..., and AB*p* of the interoffice trunk line group $T_{AB}$ which include relay contacts *a*11, *a*12, *a*13, ..., and *a*1*p* disposed in the known manner in the respective interoffice trunk lines and closed while the interoffice trunk lines are busy, respectively, and those portions of the interoffice trunk lines AD1, AD2, AD3, ..., and AD*q* in the interoffice trunk lines group $T_{AD}$ which have similar relay contacts *a*21, *a*22, *a*23, ..., and *a*2*q*, respectively. It is to be noted, however, that connections *b*11, *b*12, *b*13, ..., and *b*1*p* and *b*21, *b*22, *b*23, ..., and *b*2*q* are extended according to the teaching of this invention from the respective interoffice trunk line AB1, AB2, AB3, ..., and AB*p* and AD1, AD2, AD3, ..., and AD*q* to the exchange-trunk information unit 302A for this exchange A. The exchange-trunk information unit 302A comprises: the extensions of these connections *b*11, *b*12, *b*13, ..., and *b*1*p* and *b*21, *b*22, *b*23, ..., and b2q; connector relays C1 and C2 for the respective interoffice trunk line groups $T_{AB}$ and $T_{AD}$ and another similar connector relay (not shown) for the common control device of the exchange A; their contacts c11, c12, c13, ..., and c1p and c21, c22, c23, ..., and c2q being disposed in the connections b11, b12, b13, ..., ..., and b1p and b21, b22, b23, ..., and b2q, respectively, and similar connector relay contacts (not shown) coupled with the common control device; a countercoder 501 connected with the connector relay contacts and with the parallel-to-series converter 303 of the slave device through a set of connections 502; and a sequence control unit 503 coupled with the connector relays C1, C2, ... for cyclically operating them while supplied through the connection 343 from the series-to-parallel converter 342 of the slave device with the seizing signal. When the connector relay C1 is energized, busy interoffice trunk lines among the interoffice trunk line group $T_{AB}$ send the earth potential to the countercoder 501. Controlled also by the control unit 503 through a connection (not shown), the countercoder 501 now counts the number of either busy or idle interoffice trunk lines in the interoffice trunk line group $T_{AB}$ and sends through the connections 502 to the parallel-to-series converter 303 a set of parallel binary codes representing the counted number. While these connector relays are cyclically energized, similar sets of parallel binary codes are successively sent to the parallel-to-series converter 303.

Figure 6:
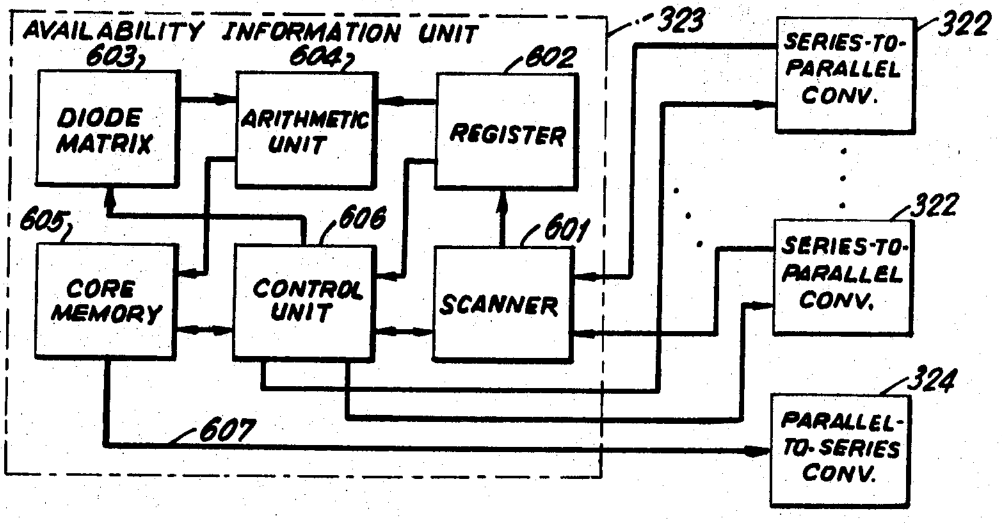
FIG. 6 is a block diagram of an availability information unit and related circuits.

Referring to FIG. 6, the availability information unit 323 comprises: a scanner 601 connected with all the master device series-to-parallel converters 322; a register 602 connected with the scanner 601; a diode matrix 603; an arithmetic unit 604 connected with the register 602 and the diode matrix 603; a core memory 605 connected with the arithmetic unit 604; and a control unit 606 connected with the scanner 601, the register 602, the diode matrix 603, and the core memory 605. The control unit 606 comprises bistable circuits (not shown) connected with the series-to-parallel converters 322, respectively. A set of connections 607 connects the core memory 605 with the master device parallel-to-series converter 324. Under the control of the control device 606, the scanner 601 scans the series-to-parallel converters 322. Each of the converters 322 produces an additional binary bit of parallel code which may be called a status bit and which assumes predetermined one of the binary value when there is parallel-code exchange-trunk information to be dealt with by the availability information unit 323. In case the status bits of some of the series-to-parallel converters 322 have the predetermined value, the scanner 601 halts at the first one of such converters 322, sends a signal to the control unit 606 to set that one of the bistable circuits in the control unit 606 which is assigned to this first converter, and transfers the exchange-trunk information from the converter to the register 602. The diode matrix 603 permanently stores criteria for judging the availability of all the exchanges having the slave devices and all the interoffice trunk line groups extending from such exchanges. The criterion is such a critical number of the busy or idle interoffice trunk line in each interoffice trunk line group that may serve as a standard for judging whether this interoffice trunk line group is available in establishing the connection for a new call. Also, the criterion may be a similar number relating to each exchange. The core memory 605 has a plurality of memory elements for elements, assigned to the respective bistable circuits of the control unit 606, storing both the parallel-code availability information and the status information which will become clear hereunder. In response to the signal sent from the scanner 601, the control unit 606 reads the status information stored in those memory elements of the core memory 605 which correspond to the set one of the bistable circuits and consequently to the master device series-to-parallel converter whose parallel-code exchange-trunk information is stored in the register 602. The status information shows that exchange coupled with the converter in question and those interoffice trunk line groups extending from this exchange which the exchange-trunk information stored in the register 602 pertains to. Based on this showing, the control unit 606 causes the diode matrix 603 to send the criterion for that exchange or interoffice trunk line group to the arithmetic unit 604. The arithmetic unit 604 subtracts either the criterion transferred from the diode matrix 603 from the exchange-trunk information supplied from the register 602 or vice versa to produce a binary code representing whether the result of subtraction is positive or negative or whether that exchange or interoffice trunk line group in question is available in establishing the connections for new calls. Under the control of the control unit 606, the binary code is stored in the core memory 605 at the address of the exchange or interoffice trunk line group in question. Furthermore, the status information stored in that memory element of the core memory 605 which corresponds to the set one of the bistable circuits is changed to show that the exchange-trunk information has successively been dealt with up to that relating to the exchange or interoffice trunk line group in question. Having sensed that this has been done, the control unit 606 resets the status bit of the series-to-parallel converter 322 in question, causes the scanner 601 to step forward, clears the register 602, and resets the bistable circuit. The scanner 601 steps on until it reaches another master device series-to-parallel converter 322 whose status bit has the predetermined value. In this manner, the binary codes for all the exchanges having the slave devices and all the interoffice trunk line groups extending from such exchanges are eventually stored in the core memory 605 and rewritten from time to time to comply with the most recent status of these exchanges and interoffice trunk line groups. In the meanwhile, the availability information is sent from the core memory 605 through the connections 607 to the master device parallel-to-series converter 324. The parallel-to-series converter 324 converts character by character the parallel-code availability information to series-code availability information.

Figure 7:
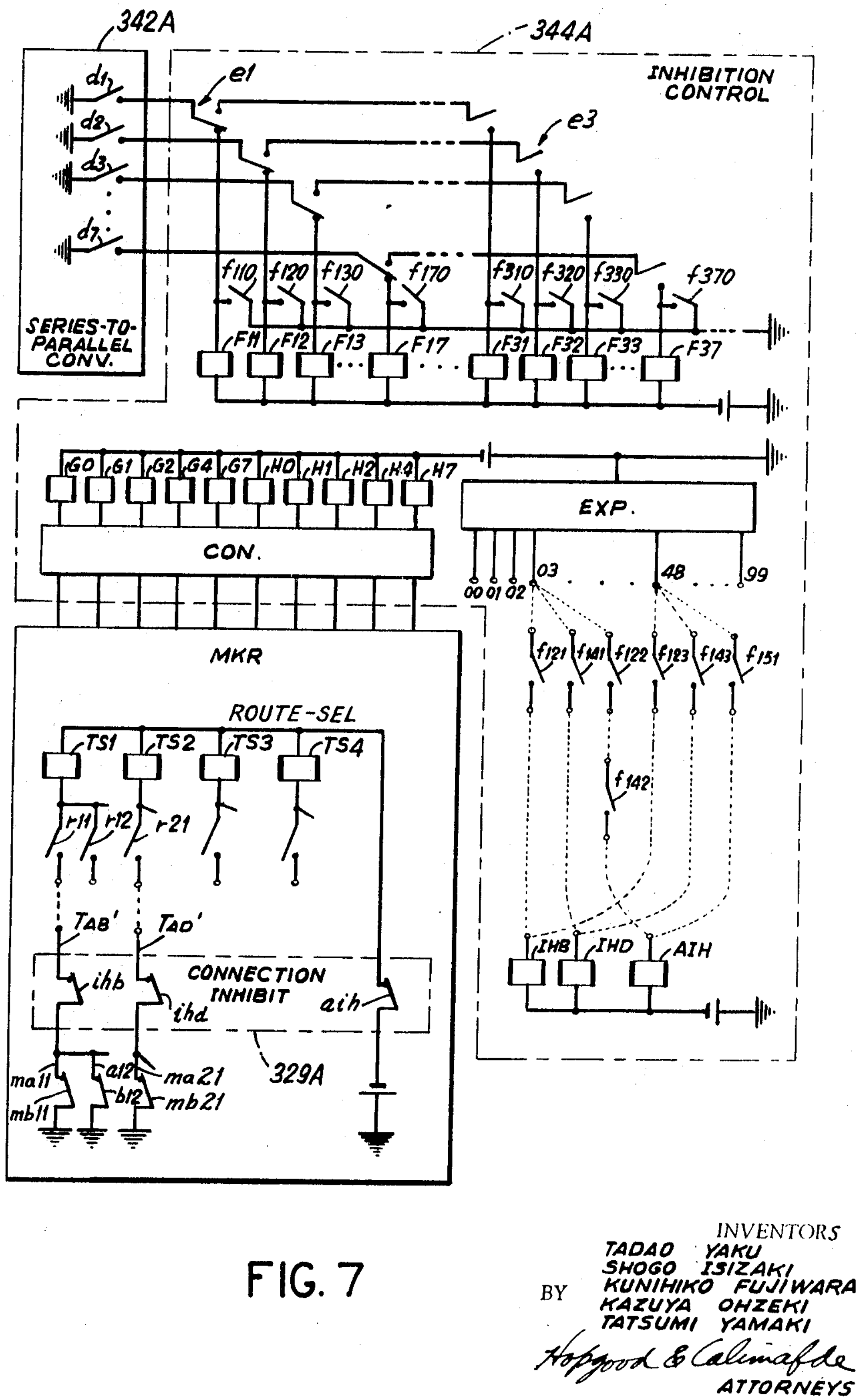
FIG. 7 is a block diagram of a connection inhibition unit and related circuits.

Referring now to FIG. 7, the slave device series-to-parallel converter 342A for the first exchange A is symbolically shown by relay contacts d1, d2, d3, ..., and d7 left open so as not to send the earth potential to the associated inhibition control unit 344A when the respective parallel codes of the availability information represent availability of the exchanges and the interoffice trunk line groups. The inhibition control unit 344A comprises: three relay contact sets e1, e2 (not shown), and e3 closed cyclically in synchronism with the application of three sets of the parallel codes to the inhibition control unit 344A, each set being connected with the converter relay contacts d1, d2, d3, ..., and d7 (in FIG. 7, the first relay contact set e1 is closed); register relay sets F11, F12, F13, ..., and F17, ..., and F31, F32, F33, ..., and F37 connected with the respective relay contact sets e1, e2, and e3 so that closure of some of the converter relay contacts d1, d2, d3, ..., and d7 may energize the corresponding ones of the register relays Fi1, Fi2, Fi3, ..., and Fi7 according to that one ei of the relay contact sets which is closed at that instant; and self-holding contacts f110, f120, f130, ..., f170, ..., f310, f320, f330, ..., and f370 for the respective register relays F11, F12, F13, ..., F17, ..., F31, F32, F33, ..., and F37. Hereunder, it is presumed that numerals of two digits are used as an office number. As is known in the art, the exchange A has a marker MKR. According to this invention, a connector CON and two sets of office number relays G0, G1, G2, G4, and G7 and H0, H1, H2, H4, and H7 are coupled with the marker MKR so that each set may be energized in two-out-of-five fashion according to the corresponding one of the digits. The inhibition control unit 344A further comprises: a 100-term expander EXP for the contacts of the number relays G0, G1, G2, G4, G7, H0, H1, H2, H4, and H7; 100 numbered terminals 00, 01, 02, 03, ..., 48, ..., and 99 to which the earth potential is given through the expander EXP according to the combination of the number relays Gj and Hk energized; a first and a second inhibition relay IHB and IHD for the respective interoffice trunk line groups $T_{AB}$ and $T_{AD}$ of the exchange A; an all inhibition relay AIH; and at least one register relay contact, such as f121, disposed between each of the numbered terminals 00, 01, 02, 03, ..., 48, ..., and 99 and each of these inhibition relays IHB, IHD, and AIH. It is furthermore assumed that the availabilities of the interoffice trunk line groups $T_{AB}$, $T_{BC}$, $T_{AD}$, $T_{DC}$, and $T_{CE}$ are registered by the register relays F11, F12, F13, F14, and F15, respectively, and that the office codes of the third and the fifth exchanges C and E are 03 and 48, respectively. A contact *f*121 of the register relay F12 is disposed between the 03 terminal and the first inhibition relay IHB; another register relay contact *f*141, between the 03 terminal and the second inhibition relay IHD; and register relay contacts *f*122 and *f*142, between the 03 terminal and the all inhibition relay AIH. Other contacts *f*123, *f*143, and *f*151 of the respective register relays F12, F14, and F15 are interposed between the 48 terminal and the inhibition relays IHB, IHD, and AIH, respectively. These and other register relay contacts may be put between the numbered terminals and the inhibition relays by the jumpers illustrated by dotted lines in various manner according to the construction of the switching network system. A conventional route selection circuit ROUTE-SEL of the marker MKR has a first, a second, a third, a fourth, ... route indication relays or connection control relays TS1, TS2, TS3, TS4, ... for the respective interoffice trunk line groups $T_{AB}$, $T_{AD}$, ... extending from the exchange A. If there are some idle interoffice trunk lines in the interoffice trunk line group $T_{AB}$, this fact is exhibited by operativeness of the first route indication relay TS1. If the interoffice trunk line group $T_{AB}$ is available, the call makes the exchange A try to establish the path of connection A—$T_{AB}$—B—$T_{BC}$—C—$T_{CE}$—E in the manner described with reference to FIG. 1. If there is no available one among the interoffice trunk line group $T_{AB}$ and, accordingly, the assigned route indication relay TS1 can not be energized but the interoffice trunk line group $T_{AD}$ is available and consequently the allotted route indication relay TS2 is operable, the call causes the exchange A to try to establish the alternative path of connection A—$T_{AD}$—D—$T_{DC}$—C—$T_{CE}$—E. It is to be understood that the availabilities of the interoffice trunk line groups $T_{AB}$, $T_{AD}$, ... extending from the exchange A are perceptible in this conventional manner without resorting to the availability information for them registered in the register relays F11, F13, ..., respectively. The route selection circuit ROUTE-SEL further has several route preference contacts *r*11, *r*12, ... connected with the first route indication relay TS1 and similar sets of route preference contacts *r*21, ... connected with other route indication relays TS2, ..., respectively. In the example being illustrated, the first route preference contact *r*11 of the contacts connected with the first route indication relay TS1 is coupled by a jumper shown by a dotted line with an intermediate connection $T_{AB}'$ leading to earth connections *ma*11, ... provided for the respective interoffice trunk lines of the interoffice trunk line group $T_{AB}$ and others of such contacts are left unconnected. The route selection circuit ROUTE-SEL still further has busy indication contacts *mb*11, ..., *mb*21, ... disposed in the respective earth connections *ma*11, ..., *ma*21, ... which are left closed while the corresponding interoffice trunk lines are idle. According to this invention, the route selection circuit ROUTE-SEL is provided with: an inhibition relay contact *ihb* of the first inhibition relay IHB disposed in the intermediate connection $T_{AB}'$; another inhibition relay contact *ihd* interposed in the intermediate connection $T_{AD}'$; and still inhibition relay contact *aih* arranged in the common connection for the route indication relays TS1, TS2, TS3, TS4, ... . These inhibition relay contacts constitute the connection inhibition unit 329A for the exchange A being considered. In case the first subscriber's station TEL1 dials the office code 48 to call the second subscriber's station TEL2, the earth potential appears at the 48 numbered terminal. If the interoffice trunk line group $T_{BC}$ is not available, energization of the register relay F12 energizes in turn the first inhibition relay IHB by the register relay contact *f*123 so as to disable operation of the first route indication relay TS1 by the inhibition relay contact *ihb*. If the interoffice trunk line group $T_{CE}$ having no alternative is not available, energization of the register relay F15 closes the register relay contact *f*151 to energize the all inhibition relay AIH and to inhibit by its contact *aih* employment of all the outgoing interoffice trunk line groups $T_{AB}$, $T_{AD}$, ... even if these interoffice trunk line groups may all be available. In case the first subscriber's station TEL1 calls another subscriber's station connected to the third exchange C, dialling of the office code 03 lets the earth potential appear at the 03 numbered terminal. If the interoffice trunk line group $T_{BC}$ is not available, energization of the register relay F12 energizes by its contact *f*121 the first inhibition relay IHB, which prohibits by its contact *ihb* employment of the interoffice trunk line group $T_{AB}$ leading to the busy or occupied interoffice trunk line group $T_{BC}$. If both interoffice trunk line groups $T_{BC}$ and $T_{DC}$ one of which must mandatorily be used to establish the connection between the calling and the called parties are not available, energization of the register relays F12 and F14 energize by their contacts *f*122 and *f*142 the all inhibition relay AIH so that the exchange A may not try at all to extend the connection for this call even though the interoffice trunk line groups $T_{AB}$ and $T_{AD}$ may have available interoffice trunk lines.

Figure 8:
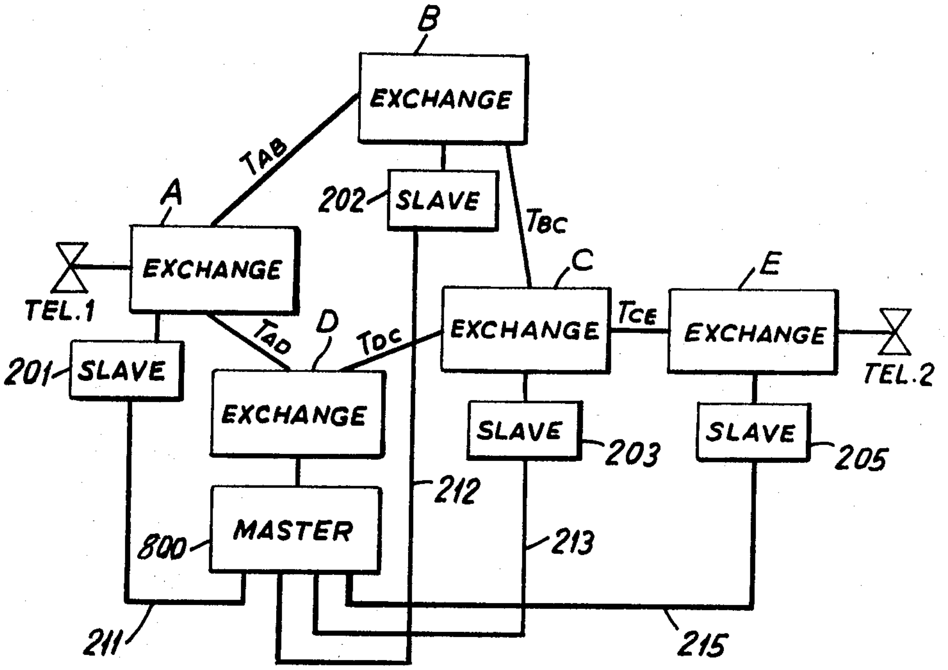
FIGS. 8 and 9 show a second embodiment of this invention.
Figure 9:
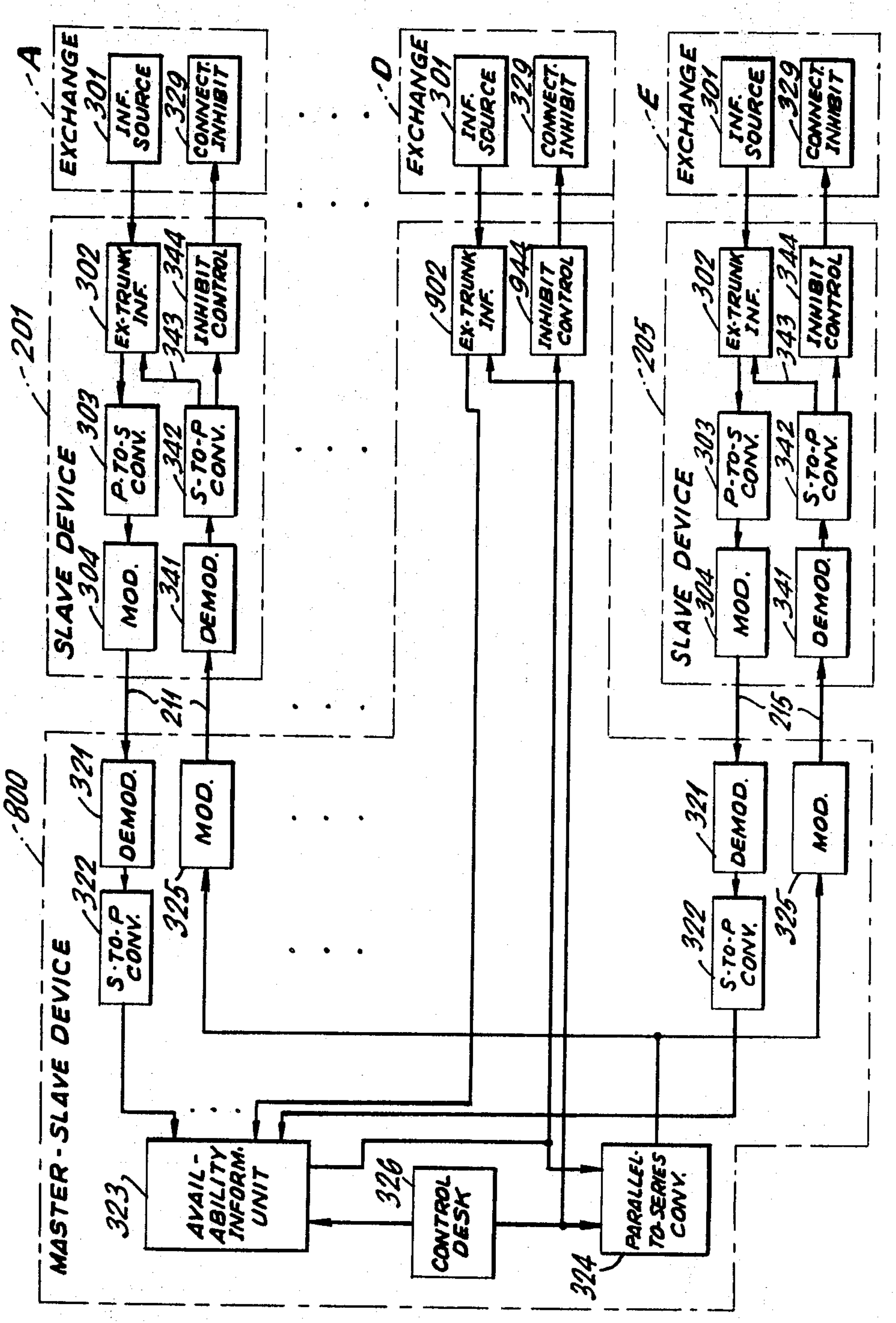

Referring finally to FIGS. 8 and 9, a second embodiment of this invention differs from the first embodiment in that a master-slave device 800 is coupled with one of the exchanges instead of the slave device provided in the first embodiment therefor. In the example being illustrated, the master-slave device 800 is coupled with the fourth exchange D. The master-slave device 800 comprises, besides the elements of the master device 200, an exchange-trunk information unit 902 connected with the information source 301 of the exchange D and direct with the availability information unit 323. The device 800 further comprises an inhibition control unit 944 connected direct with the availability information unit 323 and coupled with the connection inhibition unit 329 of the exchange D. These exchange-trunk information unit 902 and inhibition control unit 944 are of the same construction as the exchange-trunk information unit 302 and inhibition control unit 344, respectively. This embodiment works just as the first embodiment does. It will be understood that the exchange-trunk information unit 902 and the inhibition control unit 944 in the master-slave device 800 serves as a slave device for the exchange D.

While the instant invention has so far been explained, it should be understood that various other modifications of the embodiments illustrated are possible for those skilled in the art. For instance, the modulators and the demodulators may be encoders and decoders; the single data link connecting the master device with each of the slave devices may be one or several of the interoffice trunk lines.

What we claim is:

1. A switching network having a plurality of switching offices, each including switching means, a plurality of trunk lines, each extending between switching means in a predetermined two of said offices, wherein the improvement comprises:

a load information unit in at least two of said switching offices for producing, in response to interrogation, by the availability information unit a load information signal substantially representative of the number of unoccupied switching means and trunk lines thereat;

an availability information unit coupled in common to said load information units and including means for respectively translating said load information signals into availability information signals representative of the availability of said switching means and trunk lines in establishing a new connection;

and means at the switching offices having said load information units for controlling the switching means in response to said availability signal.

2. A switching network as claimed in claim 1, wherein said availability information unit further comprises means for supplying an interrogation signal, means for intermittently transmitting the interrogation signal from said source simultaneously to said load information units.

3. A switching network as claimed in claim 2, wherein said availability information unit further comprises:

a first memory for permanently storing criterion numbers for the respective interoffice trunk line groups to which the switching offices having the respective load information units are connected, each of said criterion numbers representing a standard for determining the relative availability of trunk line groups, an arithmetic unit for producing binary coded signals, each representing the difference between one of the numbers represented by said load information signals and the corresponding one of said criterion numbers, means for successively supplying said arithmetic unit with criterion signals representative of said criterion numbers simultaneously with the corresponding load information signals, a second memory for storing said binary coded signals generated by said arithmetic unit, and means for transmitting said binary coded signals, each representative of availability information associated with one of said load information units, from said second memory simultaneously to said load information units as availability information signals.

4. A switching network as claimed in claim 1, each of said switching offices having controlling means including connection control relays for extending a communication path from the associated office when there are some outgoing interoffice trunk lines available, from among the interoffice trunk line groups connected to said office, for extending said communication path in the last-mentioned interoffice trunk line groups, wherein said controlling means comprises:

terminals assigned to said switching offices, respectively, on a particular one of which a predetermined potential appears when the office the particular terminal is assigned to is called, connection inhibition relays for inhibiting, when energized, operation of the pertinent ones of said control relays, and switch means disposed between the terminals assigned to the switching offices having said load information units and said inhibition relays and operable by said availability information supplied from said availability information unit for energizing one of said inhibition relays that inhibits operation of those control relays which would establish the communication path through the interoffice trunk line group whose availability information shows that the last-mentioned interoffice trunk line group is not available for any new call.